United States Patent [19]

Moore et al.

[11] 4,234,423

[45] Nov. 18, 1980

[54] ENERGY RECOVERY SYSTEM

[75] Inventors: Albert S. Moore; Francis H. Verhoff, both of Morgantown, W. Va.

[73] Assignee: The United States of America as represented by the United States Department of Energy, Washington, D.C.

[21] Appl. No.: 25,639

[22] Filed: Mar. 30, 1979

[51] Int. Cl.³ .......................... C02F 1/74; C02F 11/08
[52] U.S. Cl. .................................. 210/758; 60/39.05; 162/31; 210/181; 210/198 R; 210/774
[58] Field of Search ............ 60/39.02, 39.05, 39.46 S; 162/31; 210/63 R, 71, 180–182, 188, 198 R, 199, 259

[56] References Cited

U.S. PATENT DOCUMENTS

| 2,773,026 | 12/1956 | Cederquist | 210/259 |
| 2,824,058 | 2/1958 | Zimmermann | 210/63 R |
| 2,903,425 | 9/1959 | Zimmermann | 210/63 R |
| 2,944,396 | 7/1960 | Barton et al. | 210/63 R |
| 2,949,010 | 8/1960 | Cederquist | 60/39.46 S |
| 3,203,175 | 8/1965 | Michalicka | 60/39.46 S |
| 3,272,740 | 9/1966 | Gitchel et al. | 210/63 R |
| 3,626,874 | 12/1971 | Grant | 210/63 R |
| 4,013,560 | 3/1977 | Pradt | 210/63 R |
| 4,100,730 | 7/1978 | Pradt | 210/63 R |

OTHER PUBLICATIONS

Zimmermann, "New Waste Disposal Process," *Chem. Eng.*, Aug. 25, 1958, 117–120.
Teletzke, "Wet Air Oxidation," *Chem. Eng. Prog.*, Jan. 1964, pp. 33–38.

Primary Examiner—Charles N. Hart
Assistant Examiner—Peter A. Hruskoci
Attorney, Agent, or Firm—James E. Denny; Stephen D. Hamel; Earl L. Larcher

[57] ABSTRACT

The present invention is directed to an improved wet air oxidation system and method for reducing the chemical oxygen demand (COD) of waste water used from scrubbers of coal gasification plants, with this COD reduction being sufficient to effectively eliminate waste water as an environmental pollutant. The improvement of the present invention is provided by heating the air used in the oxidation process to a temperature substantially equal to the temperature in the oxidation reactor before compressing or pressurizing the air. The compression of the already hot air further heats the air which is then passed in heat exchange with gaseous products of the oxidation reaction for "superheating" the gaseous products prior to the use thereof in turbines as the driving fluid. The superheating of the gaseous products significantly minimizes condensation of gaseous products in the turbine so as to provide a substantially greater recovery of mechanical energy from the process than heretofore achieved.

6 Claims, 1 Drawing Figure

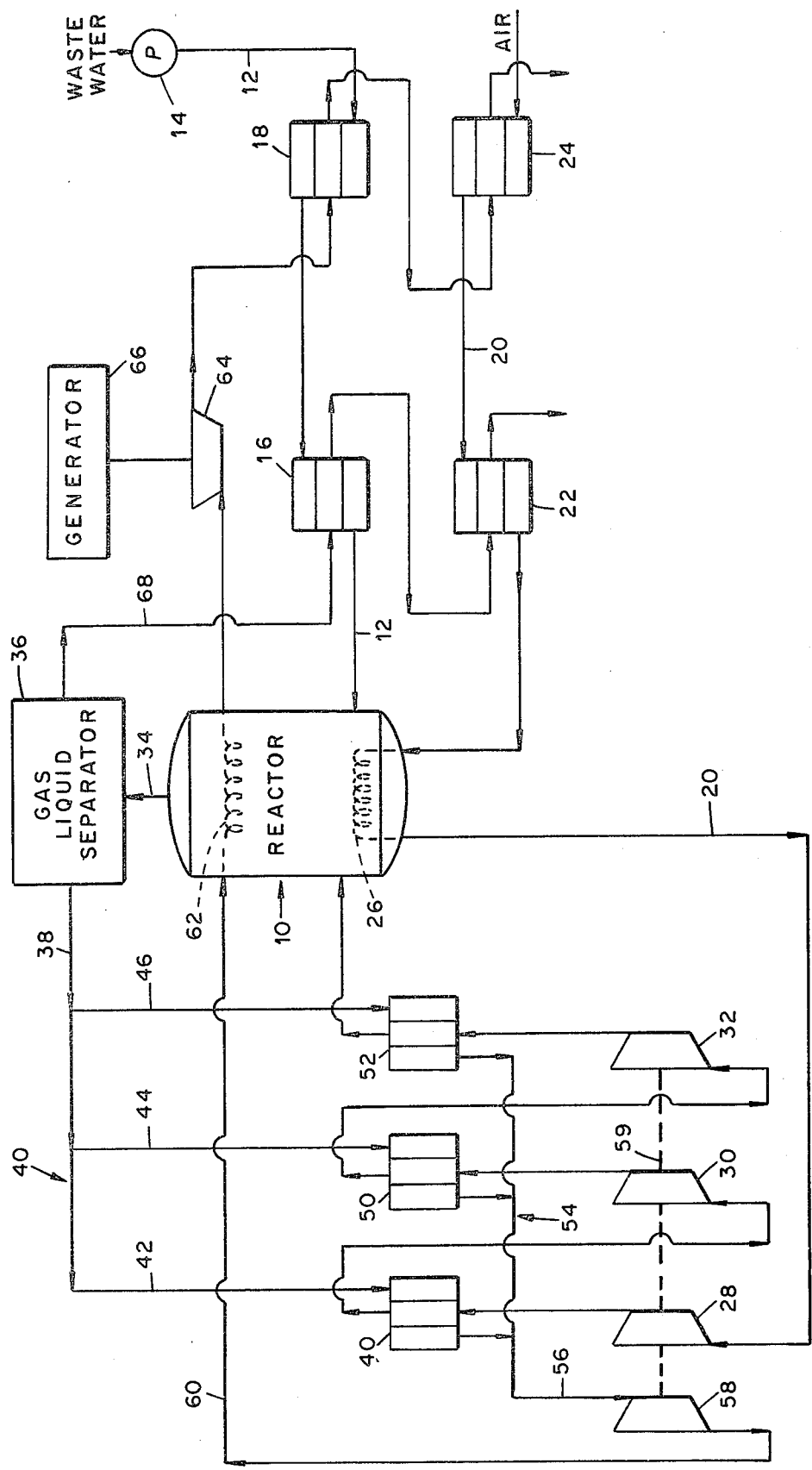

ENERGY RECOVERY SYSTEM

BACKGROUND OF THE INVENTION

The production of synthetic or fuel gas by the gasification of various coals has become increasingly attractive due to the energy demand of the world. The gas, so produced, is withdrawn from the gasification zone and subjected to a cleaning operation to rid the gas of various contaminants which are formed or liberated from the coal during the gasification operation. These contaminants are environmental pollutants and include tars, light oils, hydrogen sulfide, ammonia, cyanide, phenols, various halogens, and particulates in the form of carbon, ash and coal as well as trace metals. The disposal and control of these contaminants present a significant drawback to the acceptance of coal gasification processes as a viable energy producer.

The gas discharged from the gasifier is normally cleansed in a scrubbing system where the gas is directly contacted with a water spray which cools the gas and condenses various condensables from the gas, such as tar, oil and organics. The water used for this scrubbing operation becomes contaminated with the tars, various organic materials and soluble gases. This waste water may be subjected to a variety of operations to clean or rid the water of various contaminants so that it may be disposed of without creating an undesirable environmental problem. Such waste water cleaning steps may include the stripping of the water to remove gases, such as hydrogen, sulfide, and ammonia. Solvent extractions may be used to remove the phenols, cyanide and inorganic anions such as halogens. However, even after such treatments the water still contains a considerable quantity of materials, especially organics which must be disposed of or somehow treated without creating an environmental pollution problem. The use of containment ponds or other disposal areas for waste water containing such potential environmental pollutants creates pitfalls due to the high chemical oxygen demand (COD) of the waste water and the possibility that these contaminated waters may enter the water table or invade surface waters.

SUMMARY OF THE INVENTION

It is the primary aim, or goal, of the present invention to provide a system for effectively eliminating the pollutants and contaminants entrained in the water utilized for gas scrubbing processes in coal gasificaion systems. The present invention contemplates the accomplishment of this goal by utilizing an improved wet air oxidation system and method for effectively oxidizing the pollutants in the waste water to render them environmentally acceptable for disposal in any suitable manner without suffering the problems previously encountered with the dispoal of waste water pollutants. The chemical oxygen demand of the organic matter in the waste water removed from the scrubbers is normally in the range of about 2,000 to 100,000 milligrams per liter of water. This chemical oxygen demand, especially at the higher values, provides for a means by which the pollutants may be rendered environmentally inert by wet air oxidation while simultaneously generating more than sufficient energy for operating the wet air oxidation system.

With most liquid wastes the energy value of the organic matter in the waste is such that a chemical oxygen demand of 1,000 milligrams per liter of liquid is equivalent in heat value to about 50–56 Btu's per gallon of waste liquid. Thus, with the waste water from the scrubbers having a chemical oxygen demand in the range of about 2,000 to 100,000 milligrams per liter it is clear that a significant source of energy is available for use. As contemplated by the present invention the wet air oxidation process is considered to be a satisfactory mechanism for utilizing the heat value in the waste water for effectively destroying the pollutants within the waste water while simultaneously generating sufficient energy to operate the wet oxidation system.

The development of the wet air oxidation process has been generally attributed to Frederick J. Zimmerman and is described in the literature, such as in *Chemical Engineering*, Vol. 65, No. 17, pages 117–120 (1958). In this process organic matter in waste liquor is oxidized in the presence of air in a reactor or reaction vessel at a temperature above 100° F. and normally in the range of about 450°–550° F. and at pressures in the range of about 500–1800 psig. The waste liquid which has a high chemical oxygen demand and is a highly potential environmental pollutant is fed into the wet oxidation reactor and nonpolluting odorless liquor and combustion products are withdrawn. The air and liquid waste introduced into the reactor are conventionally preheated by exiting gases and liquid to enhance the oxidation process. The air introduced into the system is pressurized to at least the reaction pressure in a suitable compressor. The combustion process within the reactor reduces the chemical oxygen demand of the waste liquid and sufficiently degrades the organic matter in the liquid so that the resulting end products will not be environmental pollutants. The reaction products consist primarily of sterile liquid, biologically stable ash, and a gaseous mixture consisting mainly of nitrogen and carbon dioxide with a slight trace of hydrocarbons which are not expected to create any environmental pollution problem.

In accordance with the present invention an improved wet air oxidation system and method are utilized for effectively eliminating or significantly minimizing the potentially environment-damaging pollutants from waste water used in scrubbing gases generated during coal gasification operations while simultaneously generating power. Waste water having a chemical oxygen demand in the range of about 6,000 to 90,000 milligrams per liter is introduced into a wet oxidation reactor and oxidized to an extent sufficient to render the combustion products environmentally acceptable. The improvement in the wet oxidation system is such that with a COD concentration above about 8,000 milligrams per liter of liquid, heat energy above that required to operate the process is effectively recovered. This excess energy may be utilized for electrical power production or any other desired function. The extent of heat energy recovered by employing the improved wet oxidation system of the present invention is significantly greater than previously known wet oxidation schemes in that about 15 to 25% mechanical energy may be recovered versus a maximum of about 10% using previously known wet oxidation apparatus.

In the present invention the air to be used in the wet oxidation process after being preheated by passage through a suitable heat exchange system as conventionally utilized is passed through an appropriately configured coil disposed within the reactor to further heat the air up to essentially the temperature of that in the reactor prior to the compression or pressurization of the air.

The pressurization of the air is, in turn, provided in compressing means capable of operating at high temperature with appropriate heat exchange means disposed at selected locations along the path of the air through and beyond the compressing means. Inasmuch as the temperature of this heated air entering the compressing means is essentially that of the reactor, the compression of the air heats the air to temperatures considerably greater than that encountered in the reactor. Therefore, by passing the gaseous combustion products exiting from the reactor through the heat exchange means associated with the compressing means the gases are heated by the air to a temperature significantly higher than that provided in the reaction vessel prior to introducing these "superheated" gaseous combustion products into the prime movers, e.g., turbines, for the operation thereof. This "superheating" of the combustion gases provides a mechanism wherein the condensation of the gases within the turbines is substantially less than that encountered in the previous wet oxidation power generating systems since the higher the temperature of the turbine operating gases the less the occurrence or percentage of condensation in the turbine. The total condensation of the gases in the turbines should be less than about 12% in order to provide sufficient power recovery in that about 1% of condensation reduces the efficiency of the turbine about 1%. As will be pointed out in greater detail below, the additional heat energy obtained by the present invention significantly increases the mechanical energy recoverable from the wet air oxidation system over that previously available.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. Also, while the improved wet air oxidation system and method of the present invention are primarily described as being used for treating waste water from scrubbers used in cleaning gases generated in coal gasifiers, it will appear clear that the present invention may be advantageously employed with other waste liquids having chemical oxygen demands in the aforementioned range. For example, effluents from paper mills, dairies, slaughter houses, chemical plants, refineries, and sewage plants may be satisfactorily used in the present invention.

DESCRIPTION OF THE DRAWING

The figure is a schematic diagram showing the arrangement of the structural components of the improved wet air oxidation system of the present invention.

DETAILED DESCRIPTION OF THE INVENTION

As generally described above the present invention relates to an improved wet air oxidation system and method for effectively reducing the chemical oxygen demand of waste water utilized in scrubbing gases generated in a coal gasification operation. The improved wet air oxidation system as generally shown in the drawing is capable of reducing the chemical oxygen demand of waste water from a level in the range of about 6,000 to 9,000 milligrams per liter to a level in the range of about 50 to 500 milligrams per liter. This reduced chemical oxygen demand is sufficiently low so as to be environmentally acceptable to the extent that the liquid remaining after the wet oxidation process may be readily discharged into a storage pond or otherwise disposed of without fear of polluting the environment. The solid matter such as ash and the like remaining after the oxidation reaction is essentially inert and may be disposed of in any satisfactory manner. The gaseous products may be used to drive a suitable prime mover such as a turbine.

It was found by the inventors that excessive condensation of these gases in the turbines may be eliminated or substantially reduced by employing turbine driving gases at a temperature significantly higher than that provided in the wet air oxidation reactor. In order to provide this high temperature for the turbine driving fluid, applicants provide an arrangement wherein the combustion supporting medium, i.e., air, is heated within the reactor to a temperature essentially similar to the temperature in the reactor and then introduced into a plurality of serially disposed compressors. The compressors, in turn, further heat the air to a temperature considerably greater than that within the reactor. This "superheated" air, in turn, is passed in a heat exchange relationship with the gaseous combustion products exiting from the reactor to superheat the latter before these gases are introduced into the turbine. It is expected that the energy recovery increase provided by the improvement of the present invention is in the order of about 24% which is considerably greater than the maximum of about 10% previously obtainable with wet air oxidation combustion systems.

Described more specifically and with reference to the accompanying drawing, the wet oxidation reactor as generally shown at 10 may be of any suitable structure such as well known in the prior art for wet oxidation operations and which is capable of operating at a temperature in the range of about 450°–600° F. and at a pressure of about 500–1,800 psig. The wet air oxidation reactor 10 is provided with the waste water to be treated from a gas producer scrubber system, not shown, through an inlet conduit or line 12. This water is at about ambient temperature and is passed through a pump 14 capable of pressurizing the water to a value sufficient to be introduced into the reactor 10. After pressurizing the waste water it is passed through serially disposed heat exchangers 16 and 18 for heating the waste water to a temperature in the range of about 400° to 600° F. The water heating mediums for heat exchangers 16 and 18 are respectively the liquid effluent and mixed gases discharged from the reactor as will be described in greater detail below. The heated waste water is introduced into the reactor where it is combined with the air to oxidize the organic material within the waste water.

The combustion or oxidation of the organic material within the waste water is achieved by employing a quantity of air sufficient to oxidize the organic material. Preferably a surplus of air in the range of about 0 to 25% greater than that necessary to support the wet oxidation process is preferably used because the oxygen pressure is difficult to control at exactly zero, and the kinetics are better with slightly elevated oxygen partial pressures. The air is introduced through air line 20 into heat exchangers 22 and 24 for preheating the air from about ambient temperature to about 300° to 500° F. The air heating mediums for the heat exchangers 22 and 24 are obtained from the discharge side of heat exchangers 16 and 18, respectively. The preheated air exiting from the heat exchanger 22 is passed in heat exchange relationship with the reacting material within the reactor 10 by employing a suitable heating coil as generally shown at 26. This heating coil 26 may be of any suitable configuration or length which will permit sufficient heat transfer from the combusting material within the reactor 10 to the air within the coil 26 to heat the air up to essentially the temperature present within the reactor. After heating the air in the coil the heated air is passed through a plurality of high temperature compressors shown at 28, 30, and 32 which are serially aligned for compressing the air to a pressure at least as great as that required for introduction into the reactor 10.

With the pressurized air combining with the waste water the wet air oxidation process proceeds to provide combustion products consisting of solid particulates as well as water and gases which are discharged from the reactor through line 34 to a suitable gas-liquid separator such as generally shown at 36. A conventional cyclone or other commonly used gas-liquid separator may be satisfactorily employed to separate the gases and liquids discharged from the reactor 10. The gases separated in the separator 36 are passed through line 38 to a manifold assembly generally shown at 40 where lines 42, 44 and 46 are respectively connected to convey the hot gases from the reactor through heat exchangers 48, 50 and 52 associated with the compressors 28, 30 and 32 for superheating the reaction gases in line 33 by extracting heat from the preheated air which was further heated during the compression thereof. As shown in the drawing, the heat exchangers 48, 50 and 52 are arranged in such a manner that the air discharged from each compressor is passed through one of the heat exchangers disposed downstream thereof where this hot air is utilized to superheat the gases from the reaction process flowing into the heat exchangers along parallel flow paths. These superheated gases which are heated to a temperature in the range of about 1000° to 1200° F. are recombined into a single stream in a manifold 54 and then conveyed via line 56 to a turbine 58. The superheated gases drive the turbine with minimal condensation problems which allow for highly efficient operation of the turbine. As shown, the turbine 58 is coupled to the compressors through a drive shaft 59 for rotating the compressors. However, it will appear clear that power generated by this turbine may also be utilized to drive other components of the system such as the water pump 14 or, for that matter, be utilized to provide drive power for the components of the gas producer, not shown. As shown in the accompanying drawing, the compressors are depicted as a plurality of separate compressors with a heat exchanger disposed downstream in the air line from each compressor; but it is to be understood that a single compressor with a plurality of stages and with inner coolers between the various stages as commercially available may be utilized to provide the necessary compression and heating requirements of the present invention.

The exhaust gases from the turbine 58 which are considerably reduced in temperature and pressure may be reheated by passing them via line 60 through a heating coil 62 in the reactor 10. These reheated gases are then conveyed into a secondary turbine 64 for driving the latter. However, if necessary, there could be further reheat cycles and turbines. As shown, the secondary turbine 64 is coupled to a generator 66. The generator 66 is merely illustrative of a mechanism by which the excess mechanical energy provided by the present invention may be utilized. The gases emerging from the turbine 64 are at essentially atmospheric pressure but still contain sufficient heat to raise the temperature of the waste water in line 12 and the air in line 20 about 160° to 190° F. and 120° to 170° F., respectively. These gases are utilized in the heat exchangers 18 and 24 respectively for this purpose of preheating the waste water and the air.

The liquid effluent discharged from the separator 36 is conveyed through line 68 for passage through heat exchangers 16 and 22 for further heating the water and air to temperatures in the range of 450° to 600° F. and 300° to 500° F., respectively. Any suitable arrangement of heat exchangers, capable of efficiently extracting the energy from the exhaust gas and exhaust liquid streams, may be used. The liquid effluent emerging from the final heat exchanger 22 may be disposed of in any suitable manner, such as a pond or any other desired containment system adequate for retaining the liquid from the wet oxidation process. However, this liquid may be allowed to enter the water table of the surrounding area since the potentially harmful constituents of the liquid had been essentially eliminated.

It will be seen that the improved wet air oxidation system and method of the present invention provide a significant improvement in the coal gasification procedures as well as effectively eliminating a major stumbling block to the acceptance of the coal gasification processes in the energy field due to the potential environmental pollution problem caused by the scrubber waste water. Further, the improved system of the present invention provides for significant energy recovery from a waste material being rendered environmentally acceptable.

What is claimed is:

1. A wet air oxidation system comprising in combination, a reactor, first and second conduit means for respectively conveying air and waste water containing organic matter into said reactor, air compressing means disposed in the first conduit means for pressurizing the air prior to the introduction thereof into the reactor, pump means in the second conduit means for pumping the waste water into the reactor, separating means arranged to receive gaseous and liquid products of wet combustion from the reactor and adapted to separate said gaseous and liquid products into separate streams, first heat exchange means disposed in said reactor for heating the air in the first conduit means to substantially the reaction temperature prior to the air entering the air compressing means, second heat exchange means coupled to said first conduit at a location downstream of at least a portion of the air compressing means, further conduit means coupled to said second heat exchange means and to said separating means for conveying the gaseous stream therefrom through said second heat exchange means to extract heat from the compressed air, and prime mover means disposed downstream of and coupled to the second heat exchange means and adapted to be driven by the heated gaseous stream.

2. A wet air oxidation system as claimed in claim 1, wherein said air compressing means comprises a plurality of serially disposed compressors, said further heat exchange means comprises a plurality of heat exchangers one disposed intermediate each compressor and one downstream of the final compressor, and wherein manifold means are disposed in said further conduit means for dividing the gaseous stream into a plurality of separate streams one to each of said heat exchangers and for recombining said separate streams after the passage thereof through said plurality of heat exchangers.

3. A wet air oxidation system as claimed in claim 2, wherein said prime mover means comprises a pair of serially aligned turbines, an additional heat exchanger means is disposed in said reactor, and wherein said further conduit means couples said pair of turbines with said additional heat exchange means being disposed on said further conduit means intermediate said pair of turbines.

4. A wet air oxidation system as claimed in claim 3, wherein still further heat exchanger means are disposed on said first and second conduit means at locations intermediate the pump means and the reactor on the second conduit means and upstream from said first heat exchanger means, and wherein said still further heat exchange means are adapted to receive the liquid stream from said separating means and the gaseous stream from the turbines.

5. An improved wet air oxidation method for reducing the chemical oxygen demand of organic matter in waste water while simultaneously recovering energy in excess of that required for practicing the method, comprising the steps of pumping the waste water into a reactor, providing the reactor with a volume of air sufficient to support wet combustion of the organic matter at a temperature in the range of about 450° to 600° F. and at a pressure in the range of about 500 to 1800 psig, pressurizing the air to a pressure at least as great as that in the reactor, separating gaseous and liquid products of combustion from the reactor into separate streams, directing the gaseous stream into prime mover means for the operation thereof; the improvement comprising the steps of heating the air to a temperature substantially equal to that present in the reactor prior to the pressurization thereof, further heating the air to a temperature substantially greater than that present in the reactor during the pressurization thereof, and heating the gaseous stream with the further heated air to a temperature greater than that of the gaseous stream exiting the reactor prior to the introduction of the gaseous stream into the prime mover.

6. An improved wet air oxidation method as claimed in claim 5, wherein the chemical oxygen demand is in the range of 2,000 to 100,000 mg/l, wherein the gaseous stream is heated to a temperature in the range of 1,000° to 1,200° F. prior to the introduction thereof into the prime mover, and wherein the energy recovery is in the range of 15 to 25 percent.

* * * * *